United States Patent
Silberfenig

(10) Patent No.: US 6,243,594 B1
(45) Date of Patent: Jun. 5, 2001

(54) COMBINATION CELLULAR TELEPHONE AND SOUND STORAGE DEVICE AND METHOD OF USE

(76) Inventor: Shimon Silberfenig, 26130 Alizia Canyon Dr., Unit B, Calabasas, CA (US) 91302

( * ) Notice: Subject to any disclaimer, the term of this patent is extended or adjusted under 35 U.S.C. 154(b) by 0 days.

(21) Appl. No.: 09/329,562

(22) Filed: Jun. 9, 1999

(51) Int. Cl.$^7$ ............................................. H04B 1/38
(52) U.S. Cl. ................... 455/556; 455/412; 455/569; 379/85
(58) Field of Search .................... 455/556, 412, 455/90, 344, 413, 550, 575, 569; 379/674, 68, 85

(56) References Cited

U.S. PATENT DOCUMENTS

| | | | |
|---|---|---|---|
| Re. 34,976 | 6/1995 | Helferich et al. | 379/88 |
| 4,468,813 | 8/1984 | Burke et al. | 455/38 |
| 4,481,382 | * 11/1984 | Villa-Real | 179/2 EA |
| 4,500,752 | 2/1985 | Lee | 179/2 |
| 4,677,657 | 6/1987 | Nagata et al. | 379/63 |
| 5,444,761 | 8/1995 | Nagashimi | 379/58 |
| 5,802,460 | 9/1998 | Parvulescu et al. | 455/92 |
| 5,867,793 | * 2/1999 | Davis | 455/556 |
| 5,890,074 | * 3/1999 | Rydbeck et al. | 455/558 |
| 6,029,063 | * 2/2000 | Parvulescu et al. | 455/412 |
| 6,131,042 | * 10/2000 | Lee et al. | 455/556 |

FOREIGN PATENT DOCUMENTS

WO 90/13196    11/1990 (WO).

* cited by examiner

*Primary Examiner*—Edward F. Urban
(74) *Attorney, Agent, or Firm*—Eric Karich

(57) ABSTRACT

A combination cellular telephone and sound storage device has a traditional cellular telephone having a microphone that is operably connected to a transmitter/receiver which is operatively connected to a speaker. The invention further include a sound storage device, preferably a non-volatile analog memory chip, that is also operatively connected to both the microphone and speaker. The circuit connecting the memory chip to the microphone is controlled by a record switch. The record switch is operatively controlled by a record button, thereby allowing the user to record verbal notes made into the microphone during the course of the conversation. The memory chip is operatively connected to the speaker through a play switch. The play switch is operatively controlled by a play button, thereby allowing the user to replay the verbal notes recorded on the microphone. In its preferred embodiment, the combination further includes a mute button so that the user can record verbal notes without the other person being able to hear the verbal notes. The invention enables the method of using the combination to make verbal notes while talking on the cellular phone.

6 Claims, 1 Drawing Sheet

COMBINATION CELLULAR TELEPHONE AND SOUND STORAGE DEVICE AND METHOD OF USE

BACKGROUND OF THE INVENTION

1. Field of the Invention

This invention relates generally to cellular telephones, and more particularly to a cellular telephone having an integral memory chip for recording verbal notes made by the user while he or she is talking in the cellular telephone.

2. Description of Related Art

The following art defines the present state of this field:

Helferich et al., U.S. Pat., RE. No. 34,976 describes an analog-to-digital voice storage cellular telephone for recording voice messages while the user is away from the cellular telephone unit. In a preferred embodiment, the analog-to-digital voice storage cellular comprises call-answering circuitry which is activated after a predetermined number of rings. Detection circuitry waits to detect an SAT signal during a preset period of time. Once the SAT signal is detected a prerecorded outgoing message is transmitted to the caller. The voice storage cellular telephone records incoming voice messages, which are retrieved and replayed by users at their convenience. If the SAT signal is not detected, call-terminating circuitry immediately terminates call. In accordance with one aspect, voice messages may be recorded at the central cellular station in real time, subsequently transmitted to the voice storage cellular telephone at a high speed and reproduced at normal speed to reduce air transmission time and cost.

Burke et al., U.S. Pat. No. 4,468,813 describes a digital voice storage system adapted for use in a multiple unit land mobile radio communications systems. The system utilizes a PSK signaling system with fixed length data packets to control a system capable of multiple message storage of speech at mobile stations. Up to eight 64K dynamic RAMS are used in conjunction with a microprocessor to store up to 42 seconds of speech comprising up to eight separate messages. In addition, the system permits base interrogation of mobiles to determine if a message has been stored for review by the base operator and to determine the remaining recording capacity and total recording capacity of the mobile.

Lee, U.S. Pat. No. 4,500,752 describes a cordless telephone with a normal tape recorder or micro-cassette tape recorder operated by touch and is coupled to the main body of the telephone. The tape recorder operates on a cordless remote-control unit at remote distances from basic unit by means of control switch (record, play basic, rewind, fast forward, stop) attached to the remote unit. This arrangement provides a remote control record/play back cordless telephone or before the speaking begins. The remote unit includes a digital encode circuit that converts the signal of a selected function for control switch into a digital signal corresponding to the selected function, FM-modulates and amplifies said digital signal, and then cordlessly transmits it to base unit. On the other hand, base unit includes a complementary digital decode circuit and transceiver.

Nagata et al., U.S. Pat. No. 4,677,657 describes a voice recording card that can record and reproduce a message and when it is inserted into a transmitting and receiving apparatus it can transmit and receive the message. In a recording mode, the message is applied through a microphone, converted into digital signal by an analog/digital converter and is recorded in a memory and is transmitted through an interface to the transmitting and receiving apparatus. In a receiving mode, the content of the message received by the transmitting and receiving apparatus is recorded in the memory through the interface and is read out, in a reproduction mode, from the memory and converted into an analog signal by a digital-analog converter to be outputted from a speaker. The card comprises a central processing unit that controls an electric structure of the card in response to the mode designated by a mode designation key included in a keyboard.

Nagashima, U.S. Pat. No. 5,444,761 describes an on-vehicle mobile radio telephone with an answering function, having the capability to automatically change the phone mode to an answer mode even if an occupant forgets to set an answer mode switch when leaving a vehicle not shift from phone mode to the answer mode while the vehicle is in motion. The on-vehicle mobile radio telephone with an answering function includes a message recording device; a handset; a channel for relaying a call signal to the handset; a call detecting device for detecting a call through the channel to generate a call detect signal; and a control device for executing an automatic reception mode to connect the channel to the message recording device according to the call detect signal with an answer mode designated. The control device includes an accessory switch (ACC) detecting device for detecting whether an accessory switch of a vehicle is on or off, whereby the automatic reception mode is initiated when the accessory switch (ACC) detecting device detects that the accessory switch is off.

Parvulescu et al., U.S. Pat. No. 5,802,460 describes a telephone handset and remote controller apparatus for transmitting information such as phone numbers and addresses for storing in a messaging device. The telephone handset and remote controller apparatus includes a housing and a plurality of actuators disposed on the housing for allowing information to be input into memory in the telephone handset and remote controller apparatus and to allow control of the operation of the telephone handset and remote controller apparatus. A radio-frequency transceiver included in the telephone handset and remote controller apparatus is responsive to the actuation of he actuators, and transmits a television control signal for controlling a television actuators, transmits a first radio-frequency signal encoded with the information in response to actuation of at least a second of the actuators, and transmits to the messaging device, a second radio-frequency signal encoded with the information in response to actuation of at least third of the actuators. The radio-frequency transceiver in the telephone handset and remote controller apparatus receives radio-frequency communication signals from an associated base station, and if the messaging device is bidirectional, also receives messaging signals from the messaging device. The telephone handset and remote controller apparatus may also have a data connector so that it may be connected to a computer in order to receive downloaded information such as software updates and the like and transmit such information to the messaging device.

Kohler, International, WO 90/13196 describes a device for telecommunication systems, in particular a telephone or radio set, or telephone station of a two-way intercom system, with a component containing at least one loudspeaker and one microphone, is designed to be held in the hand during use. An electronic device preferably a dictaphone unit, comprising a driver for a recording medium a recording and play-back unit and associated operating elements, a radio receiver unit, a personal call receiver, a device for remote polling of devices such as alarm systems, sensors, etc., a TV set, an answering machine or a device which plays and records messages, an answering machine or a device which plays and records messages, an electronic storage device or an acoustic room-monitoring device, preferably with display, is incorporated into the component and coupled electrically to the latter. Alternative, the component is designed to be coupled mechanically and electrically to the electronic device.

The prior art teaches cell phones that record messages received from the transmitter/receiver of the cell phone. However, the prior art does not teach a cell phone that allows the user to record verbal notes made by the user while he or she is talking in the cellular telephone, without recording the person to whom the user is talking. The present invention fulfills these needs and provides further related advantages as described in the following summary.

SUMMARY OF THE INVENTION

The present invention teaches certain benefits in construction and use which give rise to the objectives described below.

The present invention provides a combination cellular telephone and sound storage device and a method of using the combination to make verbal notes while talking on the cellular phone. The combination includes a traditional cellular telephone, having a microphone that is operably connected to a transmitter/receiver, which is operatively connected to a speaker. The invention further include a sound storage device, preferably a non-volatile analog memory chip, that is also operatively connected to both the microphone and speaker. The circuit connecting the memory chip to the microphone is controlled by a record switch. The record switch is operatively controlled by a record button, thereby allowing the user to record verbal notes made into the microphone during the course of the conversation. The memory chip is operatively connected to the speaker through a play switch. The play switch is operatively controlled by a play button, thereby allowing the user to replay the verbal notes recorded on the microphone. In its preferred embodiment, the combination further includes a mute button so that the user can record verbal notes without the other person being able to hear the verbal notes.

A primary objective of the present invention is to provide a combination cellular telephone and sound storage device having advantages not taught by the prior art.

Another objective is to provide a device that enables a user to make verbal notes while talking on a cellular telephone without interrupting the conversation or otherwise interrupting the user's activities, and also without recording the voice of the other person or otherwise invading the privacy of the other person.

Another objective is to provide a device having a mute function that enables a user to make verbal notes without the other person hearing the verbal notes being made.

A further objective is to provide a compact and light-weight cellular telephone that does not include a great number of additional components.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
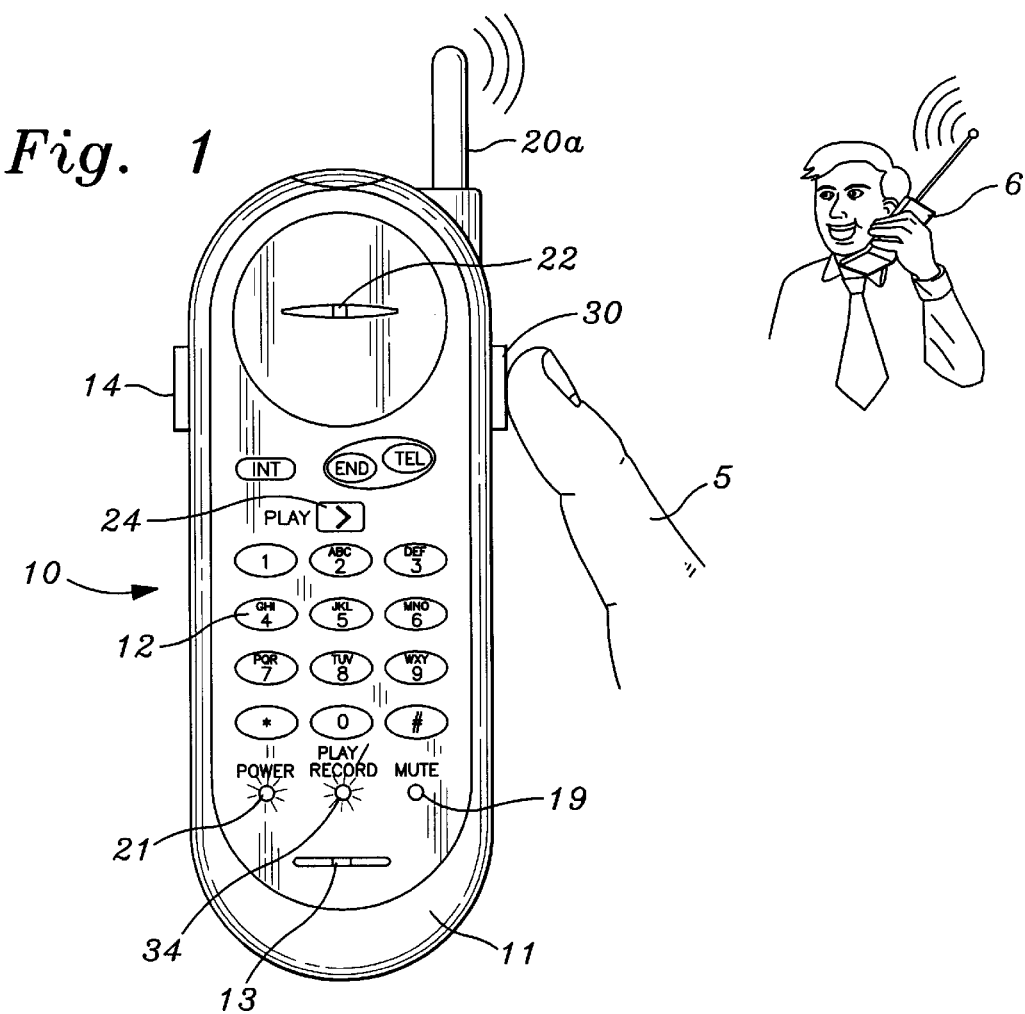
FIG. 1 is a front elevational view of the preferred embodiment of the present invention.
Figure 2:
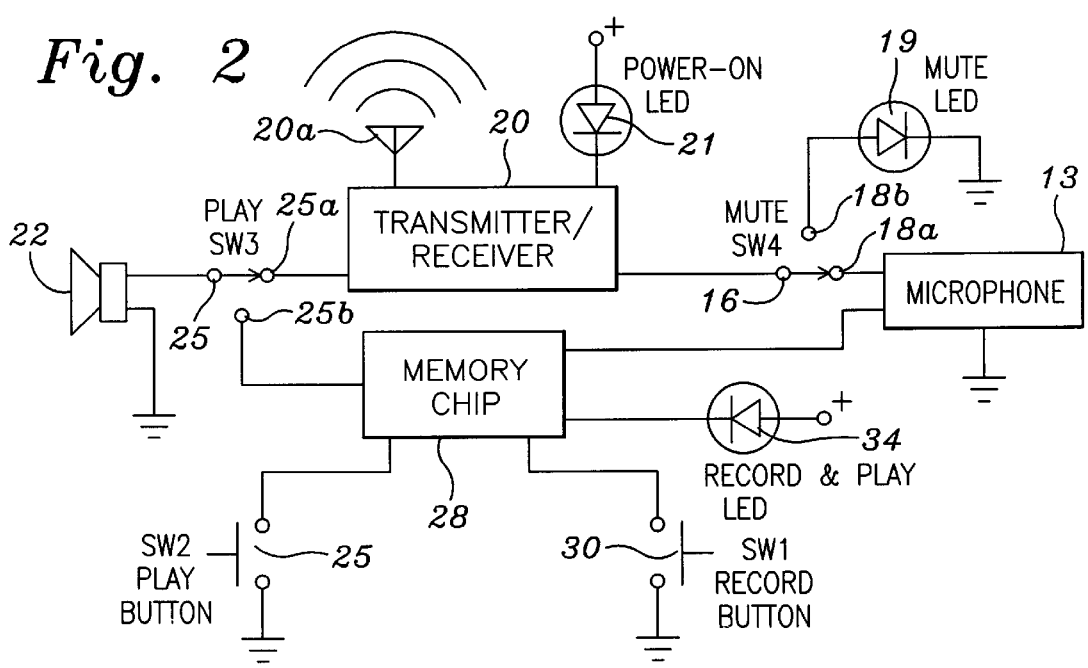
FIG. 2 is a schematic block diagram thereof.

The above described drawing figures illustrate the invention, a combination cellular telephone and sound storage device 10. While the combination 10 is described as including a cellular telephone, other portable or digital telephones could be adapted to this invention without altering the spirit of the invention. As shown in FIG. 1, the combination 10 is preferably mounted within a molded plastic housing 11 shaped as a traditional digital or cellular telephone, including a 10-key keypad 12 for dialing and any other control buttons desired for the traditional function of the digital or cellular telephone. As shown in FIG. 2, the combination 10 includes a microphone 13 that is operably connected to a transmitter/receiver 20, preferably through a mute switch 16. The mute switch 16 preferably is biased towards a transmit position 18a in which the circuit connecting the microphone 13 to the transmitter/receiver 20 is closed. A mute button 14 operates to move the mute switch 16 from the transmit position 18a to a mute position 18b when pressed. The mute switch 16 is preferably operatively connected to a mute LED 19 when in the mute position 18b. A speaker 22 is also operatively connected to the transmitter/receiver 20 through a play switch 25. The play switch 25 is biased towards a resting position 25a, in which the circuit connecting the speaker 22 and the transmitter/receiver 20 is closed and the speaker 22 emits sounds received from the transmitter/receiver 20. In its preferred embodiment, the power source (not shown) is connected to the transmitter/receiver 20 through a power LED 21 to allow easy visual confirmation that the device is operating. The transmitter/receiver 20 includes an antenna 20a to enhance the sending and reception of signals. All of these elements are well known in the art and do not require detailed description.

A memory chip 28 is also operatively connectable to both the microphone 13 and the speaker 22. The memory chip 28 is preferably a non-volatile analog sound recording chip such as manufactured by Information Storage Devices, Inc. of San Jose, Calif. The memory chip 28 preferably provides at least one minute of audio storage, although greater storage capacities should become common as technology progresses. While prior art memory devices use digital technology, the present invention preferably uses an analog memory chip 28. An analog memory chip 28 is preferred because using a system that is entirely analog does not require the analog to digital and digital to analog converters required by a digital memory chip 28. The memory chip 28 of this combination 10 therefore also does not require a central processing unit ("CPU") chip. This savings in space is critical in cellular telephones because the market demands extremely small and lightweight cellular telephones. The circuit between the memory chip 28 and the microphone 13 is operatively controlled by a record switch 32. When a record button 30 moves the record switch 32 from a non-recording position to a recording position, the circuit between the microphone 13 and the memory chip 28 is completed and sounds detected by the microphone 13, such as at least one verbal note made by a user 5, are recorded on the memory chip 28.

The circuit between the memory chip 28 and the speaker 22 is operatively controlled by a play button 24. The play button 24 operates to move the play switch 25 described above from the resting position 25a to a playing position 25b when pressed. When the play switch 25 is moved to the playing position 25b, the circuit connecting the speaker 22 and the transmitter/receiver 20 is broken and the speaker 22 is instead operatively connected to the memory chip 28. When the memory chip 28 is operatively connected to the speaker 22, the speaker 22 plays the recording of the at least one verbal note that was recorded on the memory chip 28. In its preferred embodiment, the memory chip 28 is electronically connected to a play and record LED 34. Whenever the memory chip 28 is draws current, to either record a verbal note or to play the verbal note, the play and record LED 34 lights up to provide visual confirmation or warning that the memory chip 28 is active. The memory chip 28 is preferably not operatively connected to the transmitter/receiver 20, as in the prior art. By not connecting the memory chip 28 to the transmitter/receiver 20, this combination 10 allows the user 5 to record his or her own at least one verbal note without inadvertently recording the other user 5. Since privacy is a big concern in today's society and the unauthorized recording of a conversation is illegal, this feature is an important element of this invention. Additional elements, such as fast-forward, rewind, and message selection features can be added without altering the spirit of this invention; however, the addition of these features is not presently desired due to the increased cost, bulk, and complexity.

In use, this combination 10 provides a method for recording at least one verbal note of a user 5 talking on a cellular telephone with another person 6. The user 5 first uses the combination 10 to call (or receives a call from) the other person 6. The above-described combination 10 functions as a traditional cellular telephone in this respect: the user 5 simply speaks into the microphone 13 so that the speech is transmitted by the transmitter/receiver 20 to the other person 6. The speaker 22 can also listen to the responses of the other person 6 via the speaker 22, as received by the transmitter/receiver 20. As often occurs during the course of a conversation, however, the user 5 may wish to make a note of something said by the other person 6, such as a telephone number or directions to a certain location. However, it is often not possible to make written notes while talking on the phone. Many people talk on the phone while driving or otherwise occupied, and cannot stop to take notes.

As shown in FIG. 1, this invention allows the user 5 to simply press the record button 30 conveniently located on the side of the combination 10, thereby moving the record switch 32 from a non-recording position to a recording position and operatively connecting the microphone 13 to the memory chip 28. The user 5 then speaks into the microphone 13, repeating the phone number for instance, thereby recording the at least one verbal note received by the microphone 13 on the memory chip 28 while simultaneously transmitting the at least one verbal note through the transmitter/receiver 20 to the other person 6. This allows the conversation between the user 5 and the other person 6 to continue uninterrupted while the user 5 takes notes. This also allows the user 5 to make notes while engaged in other activities without being distracted by trying to write the notes down. This can provide an important safety benefit to people who talk on their cell phones while driving or engaging in similar behavior. This combination 10 also provides the benefit of recording the user 5 without recording the other person 6 to whom the user 5 is talking. It is important, for the privacy of the other person 6 that the other person's 6 voice is not recorded while this recording is made, due to the privacy concerns noted above.

Sometimes, however, the user 5 may wish to make verbal notes during the conversation that the other person 6 cannot hear. This invention provides a mute button 14 that functions to move the mute switch 16 from the transmit position 18a to a mute position 18b, thereby preventing the at least one verbal note from being transmitted to the other person 6. By holding both the record button 30 and the mute button 14, the user 5 can make verbal notes on the memory chip 28 without transmitting the verbal note through the transmitter/receiver to the other person 6. The user 5 can then release the mute button 14 at any time, thereby allowing the mute switch 16 to return to the transmit position 18a and reestablishing the operative engagement of the microphone 13 to the transmitter/receiver 20. Of course, the user 5 can discontinue recording by releasing the record button 30, thereby allowing the record switch 32 from a recording position to a non-recording position and halting the recording. When the user 5 desires to remember the at least one verbal note recorded on the memory chip 28, after terminating the call with the other person 6, the user 5 can simply wait until it is convenient and press the play button 24, thereby operating to move the play switch from the resting position 25a to a playing position 25b and transmitting the at least one verbal note from the memory chip 28 to the speaker 22. Upon listening to the at least one verbal note, the user 5 can write the information down, dial the phone number, or take any other action that is appropriate.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination cellular telephone and sound storage device, the combination comprising:

a microphone that is operably connected to a transmitter/receiver through a mute switch when the mute switch is in the transmit position, a mute button operating to move the mute switch from the transmit position to a mute position when pressed;

a speaker that is operatively connected to the transmitter/receiver through a play switch when the play switch is in a resting position, a play button operating to move the play switch from the resting position to a playing position when pressed;

a memory chip operatively connected to the microphone, the memory chip being controlled by a record switch and functioning to record a sound received by the microphone when a record button moves the record switch from a nonrecording position to a recording position;

the memory chip being operatively connected to the speaker when the play switch is in the playing position, the play switch thereby activating the memory chip for playing the recording of the sound on the speaker; and wherein the memory chip is not operatively connected to the transmitter/receiver.

2. The combination of claim 1 wherein the mute switch is operatively connected to a mute LED when in the mute position.

3. The combination of claim 1 wherein the memory chip is a analog sound recording chip.

4. The combination of claim 3 wherein the memory chip does not include a central processing unit chip.

5. The combination of claim 1 wherein the memory chip is a non-volatile analog sound recording chip.

6. A method for recording at least one verbal note of a user talking on a cellular telephone with another person, the method comprising the steps of:

a) providing a combination cellular telephone and analog sound storage device,
   the combination comprising:
      a microphone that is operably connected to a transmitter/receiver through a mute switch when the mute switch is in the transmit position;
      a speaker that is operatively connected to the transmitter/receiver through a play switch when the play switch is in a resting position;
      a non-volatile analog memory chip operably connectable to the microphone with a record switch, the memory chip also being operably connectable to the speaker with a play button; and
      a mute button operating to move the mute switch from the transmit position to a mute position when pressed;
   b) calling the other person with the cellular telephone;
   c) speaking into the microphone so that the speech is transmitted by the transmitter/receiver to the other person;
   d) listening to the speaker to hear the response of the other person as received by the transmitter/receiver;
   e) pressing the mute button to move the mute switch from the transmit position to a mute position, thereby preventing the at least one verbal note from being transmitted to the other person, while not recording the at least one verbal note;
   f) pressing the record button thereby moving the record switch from a non-recording position to a recording position and operatively connecting the microphone to the memory chip;
   g) speaking into the microphone, thereby recording on the memory chip another of the at least one verbal note received by the microphone without transmitting the at least one verbal note through the transmitter/receiver to the other person, so the user can make verbal notes without the other person hearing what is said;
   h) releasing the mute button, thereby allowing the mute switch to return to the transmit position and reestablishing the operative engagement of the microphone to the transmitter/receiver;
   i) releasing the record button, thereby allowing the record switch from a recording position to a non-recording position and halting the recording;
   j) terminating the call with the other person;
   k) pressing the play button when the user desires to remember the at least one verbal note recorded on the memory chip, thereby operating to move the play switch from the resting position to a playing position and transmitting the at least one verbal note from the memory chip to the speaker; and
   l) listening to the at least one verbal note.

\* \* \* \* \*